United States Patent Office 2,891,823
Patented June 23, 1959

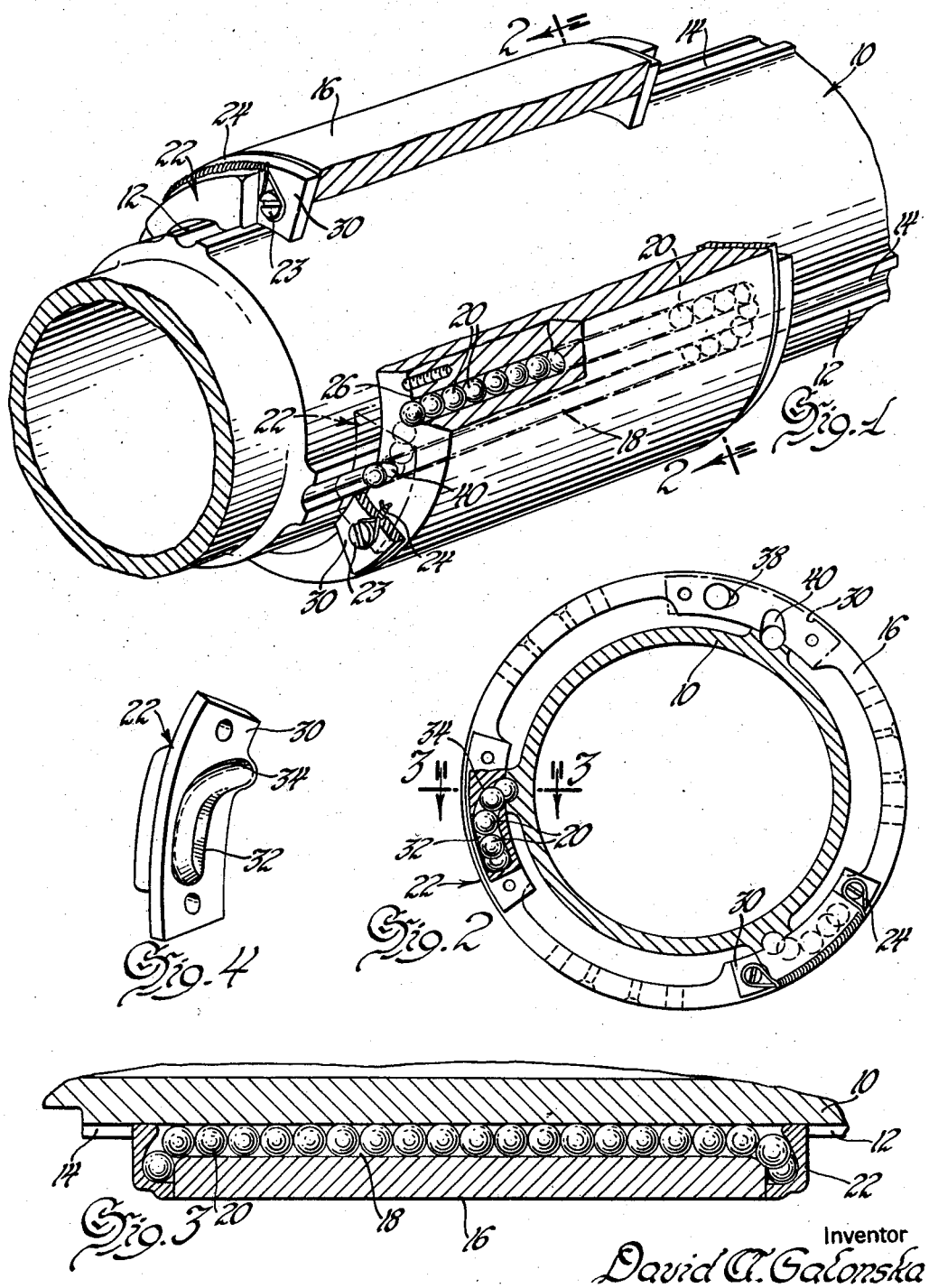

2,891,823

BALL BEARING SPLINE

David A. Galonska, Saginaw, Mich., assignor to General Motors Corporation, Detroit, Mich., a corporation of Delaware Application April 20, 1955, Serial No. 502,562

5 Claims. (Cl. 308—6)

This invention relates to a ball bearing mechanism permitting relative linear movement between a pair of telescoping parts, while preventing relative rotary movement thereof.

Various applications exist for mechanisms of the indicated type. Thus they find utility in the machine tool industry, for example, and in aircraft control systems. Also, in heavy aircraft involving outrigger landing gears, such a mechanism may be used, with advantage, in lieu of the conventional torque arms which prevent twisting of the landing struts during taxiing but which, to the extent permitted by the hydraulic shock absorbing devices built into the outrigger assemblies, allow for relative axial movement between the wheel carrying portions of the landing struts and the strut members connected to the wings. This substitution is particularly indicated if the wings are of thin section, as is usually true where the aircraft is jet-propelled. In such case, adequate space is generally not available for storage of torque arms, as well as the other parts of the landing gear assemblies, in the wings during flight.

The objects and purposes of the invention being implicit in the foregoing, the same will now be particularly described with reference to the accompanying drawings illustrating a preferred embodiment of the invention and in which:

Figure 1 is a perspective, partly in section;

Figure 2 is a section on line 2—2 in Figure 1;

Figure 3 is a fragmentary section on the line 3—3 in Figure 2; and

Figure 4 is a detail of one of the parts of the assembly.

Referring first to Figures 1 and 2, the numeral 10 denotes a tubular member having a plurality of radially projecting splines 12, each spline being centrally grooved over its length at 14. In the particular embodiment three splines are employed, spaced 120° apart measured from their centers.

Surrounding the tubular member 10 is a sleeve 16 having internal grooves 18 in registry with and complementary to the grooves 14 so as to provide courses for balls 20 which constitute a continuous train.

In addition to the grooves 18, the sleeve 16 has therein a plurality of holes or bores 26 extending the length of the sleeve. The diameter of these bores is substantially the same as that of the ball courses provided by the registering grooves 14, 18.

Fixed to the sleeve 16 by means of screws 23 at either end thereof are return fixtures 22, completing the closed, continuous passageway for the balls. These fixtures will be seen as comprising integral flange portions 30 through which the screws 23 pass. Lockwires 24 lock the screws in place.

As viewed from the end of the sleeve 16, the ball courses provided by the fixtures 22 (Figures 2 and 4) comprise a substantially straight path or section 32 and a curved section 34. The inner of the walls defining these courses and contacted by the balls are end surfaces of the sleeve 16 over which the fixtures are fitted. To avoid any possibility of jamming and to assure a smooth even flow of the balls during relative axial movement of the splined tube and the sleeve, grooves 18 and bores 26 are flared or cut away at their ends, the flared portions 38, 40 extending in directions consistent with the conformation of the return fixtures and the flow of the balls therethrough.

From the foregoing, it should be apparent that the present invention provides extremely simple yet highly effective means for interconnecting telescoping parts one of which must be axially movable relative to the other but restrained against relative rotary movement. The several parts of the device are readily fabricated and assembled and the possibility of failure of the device in operation is so remote as to be virtually non-existent.

I claim:

1. A ball bearing mechanism comprising telescoping members of generally cylindrical conformation, one of said members having a grooved spline paralleling the axis thereof and projecting radially toward the other of said members, the said other of said members having therein a groove in registry with and complementary to the groove in said first member to form a ball course and further having a bore therethrough paralleling the axis thereof, said bore being circumferentially offset from said course, and means interconnecting the ends of said bore with the corresponding ends of said course to provide an endless ball passageway.

2. A ball bearing mechanism comprising inner and outer sleeve members in telescoping relation, one of said members having a plurality of splines paralleling the axis thereof and projecting radially toward the other of said members, said splines being centrally grooved over their length, the said other of said members having therein a plurality of grooves in registry with and complementary to the grooves in said first member to form ball courses and further having a plurality of bores therethrough and paralleling the axis thereof, said bores being equal in number to the number of said courses and being circumferentially offset from said courses, and means interconnecting the ends of each of said bores with the corresponding ends of the adjacent course to provide an endless, closed ball passageway, said means being fixedly secured to said other member.

3. A ball bearing mechanism comprising inner and outer sleeve members in telescoping relation, the inner of said members having a plurality of splines paralleling the axis thereof and projecting radially toward the outer member, said splines being centrally grooved over their length, the said outer member having therein a plurality of grooves in registry with and complementary to the grooves in said inner member to form ball courses and further having a plurality of bores therethrough paralleling the axis thereof and equal in number to the number of grooves therein, said bores being circumferentially offset from said courses, and means fixedly secured to said outer member serving to interconnect the ends of each of said bores with the corresponding ends of the adjacent course to provide an endless, closed ball passageway.

4. A ball bearing mechanism comprising telescoping members of generally cylindrical conformation, one of said members having a grooved spline paralleling the axis thereof and projecting radially toward the other of said members, the said other of said members having therein a groove in registry with and complementary to the groove in said first member to form a ball course and further having a bore therethrough paralleling the axis thereof, said bore being circumferentially offset from said grooves, and means fixedly secured to said other member interconnecting the ends of said course and the corresponding ends of said bore to provide with end surfaces of said last member an endless ball passageway.

5. A ball bearing mechanism comprising inner and outer sleeve members in telescoping relation, the inner of said members carrying a spline paralleling the axis thereof and projecting radially toward the outer member, said spline being centrally grooved over its length, the said outer member having a groove in registry with and complementary to the groove in said inner member to form a ball course and further having a bore therethrough paralleling the axis thereof, said bore being circumferentially offset from said grooves, both said bore and said groove in said outer member having flared end portions, and a pair of fixtures secured to said outer member over end surfaces thereof to interconnect the ends of said bore and the corresponding ends of said course thereby to provide an endless, closed ball passageway, said fixtures each prescribing a straight course and a curved course as required by said offsetting, the said flaring at the ends of said bore and at the ends of said groove in said outer member being in directions facilitating the smooth transfer of balls between said fixtures, said course and said bore.

References Cited in the file of this patent

UNITED STATES PATENTS

| | | |
|---|---|---|
| 1,094,972 | Bocorselski | Apr. 28, 1914 |
| 2,493,342 | Eldred et al. | Jan. 3, 1950 |
| 2,576,269 | Thomson | Nov. 27, 1951 |

FOREIGN PATENTS

| | | |
|---|---|---|
| 679,843 | Great Britain | Sept. 24, 1952 |